US010071478B2

(12) United States Patent
Houston et al.

(10) Patent No.: US 10,071,478 B2
(45) Date of Patent: Sep. 11, 2018

(54) PARALLEL ROBOT BRACKETING SYSTEM

(71) Applicants: Robert Kevin Houston, Orlando, FL (US); James Zachary Monninger, Orlando, FL (US)

(72) Inventors: Robert Kevin Houston, Orlando, FL (US); James Zachary Monninger, Orlando, FL (US)

( * ) Notice: Subject to any disclaimer, the term of this patent is extended or adjusted under 35 U.S.C. 154(b) by 537 days.

(21) Appl. No.: 14/139,155

(22) Filed: Dec. 23, 2013

(65) Prior Publication Data

US 2015/0176754 A1 Jun. 25, 2015

(51) Int. Cl.
*B25J 9/00* (2006.01)
*F16M 13/02* (2006.01)
*F16B 7/18* (2006.01)

(52) U.S. Cl.
CPC .......... *B25J 9/0042* (2013.01); *B25J 9/0009* (2013.01); *F16B 7/185* (2013.01); *F16M 13/02* (2013.01)

(58) Field of Classification Search
CPC ...... B25J 9/1623; B25J 9/0042; B25J 9/0009; F16B 7/185; F16M 13/02
USPC ........... 74/490.01–490.05; 248/202.1, 220.1, 248/220.21, 125.1
See application file for complete search history.

(56) References Cited

U.S. PATENT DOCUMENTS

| | | | | |
|---|---|---|---|---|
| 2,609,418 A | * | 9/1952 | Binns ........................ | F16B 7/18 |
| | | | | 174/163 R |
| 2,990,203 A | * | 6/1961 | Grover ...................... | E04G 7/02 |
| | | | | 182/186.7 |
| 3,044,656 A | * | 7/1962 | Dobbie .................. | B65D 88/12 |
| | | | | 217/69 |

(Continued)

FOREIGN PATENT DOCUMENTS

| DE | 19958163 C1 * | 4/2001 | ............... E04C 3/06 |
|---|---|---|---|
| DE | 10211055 A1 * | 10/2003 | ............... B23Q 1/48 |

(Continued)

OTHER PUBLICATIONS

Steve Garber _ Cerberus, Mar. 16, 2013, http://web.archive.org/web/20130316021139/http://www.reprap.org/wiki/Cerberus.*

(Continued)

*Primary Examiner* — Muhammad Ijaz
(74) *Attorney, Agent, or Firm* — Matthew G. McKinney, Esq.; Allen, Dyer et al.

(57) ABSTRACT

A bracketing system provides a structural support for a parallel robot and the moving components thereof. The bracketing system also serves to increase the functionality of the parallel robot. The bracketing system includes a plurality of aluminum brackets fabricated through extrusion, and serving as heat sinks The brackets comprise a substantially triangular shaped bracket disposed to integrally join with the vertices of a plurality of horizontal members and a plurality of vertical members on the parallel robot. The horizontal members and the vertical members form a triangle shape (Continued)

with three vertices and three sides. This allows for six brackets to position between an inner surface of each vertex. Mounting holes on the brackets enable a fastener to pass through for attaching the brackets to the vertical members and the horizontal members. The brackets slide along the vertical member to enable tightening of a tension belt and adding accessories.

12 Claims, 6 Drawing Sheets

(56) References Cited

U.S. PATENT DOCUMENTS

| | | | | |
|---|---|---|---|---|
| 3,789,562 | A * | 2/1974 | De Chicchis | A63H 33/107 403/106 |
| 4,308,699 | A * | 1/1982 | Slysh | B64G 9/00 244/159.5 |
| 4,334,816 | A * | 6/1982 | Slysh | B64G 9/00 104/287 |
| 4,577,449 | A * | 3/1986 | Celli | E04B 1/2403 182/186.8 |
| 5,269,394 | A * | 12/1993 | Haroldson, Sr. | E04G 7/28 182/113 |
| 5,960,672 | A * | 10/1999 | Pritschow | B23Q 1/5462 74/490.03 |
| 6,205,739 | B1 * | 3/2001 | Newlin | E04B 1/19 52/645 |
| 6,285,098 | B1 * | 9/2001 | Nestler | H02K 41/031 310/12.04 |
| 6,467,230 | B1 * | 10/2002 | Perkins | E04F 11/1812 248/220.1 |
| 6,931,793 | B2 * | 8/2005 | Joyce | E04D 13/0315 182/112 |
| 6,944,024 | B1 * | 9/2005 | Devine, III | H04R 9/022 165/185 |
| 7,516,816 | B2 * | 4/2009 | Higgs | E04G 21/3233 182/113 |
| 7,882,666 | B2 * | 2/2011 | Karalic | E04B 1/14 403/170 |
| 8,833,714 | B2 * | 9/2014 | Haddock | H02S 20/00 248/237 |
| 2003/0005786 | A1 * | 1/2003 | Stuart | B23Q 1/5462 74/479.01 |
| 2007/0063118 | A1 * | 3/2007 | Owens | A47C 4/02 248/300 |
| 2007/0284492 | A1 * | 12/2007 | Oh | F16M 11/06 248/220.1 |
| 2011/0286121 | A1 * | 11/2011 | Werner | F24J 2/14 359/872 |
| 2014/0311553 | A1 * | 10/2014 | Haddock | E04F 13/0817 136/251 |
| 2015/0176754 | A1 * | 6/2015 | Houston | B25J 9/0009 248/125.2 |
| 2016/0332296 | A1 * | 11/2016 | Kurnianto | B25J 9/02 |
| 2017/0050278 | A1 * | 2/2017 | Jaster | B23Q 1/017 |

FOREIGN PATENT DOCUMENTS

| | | | | |
|---|---|---|---|---|
| DE | 102004010826 | A1 * | 10/2004 | B23Q 1/015 |
| EP | 1113191 | A2 * | 7/2001 | B23Q 1/34 |
| EP | 1637277 | A1 * | 3/2006 | B23Q 1/34 |
| WO | WO 2004076132 | A2 * | 9/2004 | B23Q 1/015 |

OTHER PUBLICATIONS genomicon, Rostock and Vitamin Parts, Nov. 4, 2012 _ http://www.genomicon.com/2012/10/rostock-and-vitamin-parts/.*
Johann, Mini Kossel, Jul. 29, 2013, http://web.archive.org/web/20130729200057/http://deltabot.tumblr.com/.*
Johann, Kossel, Nov. 17, 2012, http://web.archive.org/web/20121117043713/http://deltabot.tumblr.com/.*
Johann, Kossel, Dec. 29, 2012, http://web.archive.org/web/20121229151041/http://reprap.org/wiki/Kossel.*
Johann Rocholl, Johann C. Rocholl's photos, May 31, 2013, https://www.flickr.com/search/?user_id=jcrocholl&tags=kossel&min_taken_date=1357016400&max_taken_date=1370059199.*
Johann C Rocholl's Photostream/Tags/Kossel, May 7, 2013, http://web.archive.org/web/20130507015852/http://www.flickr.com/photos/jcrocholl/tags/kossel.*

* cited by examiner

PARALLEL ROBOT BRACKETING SYSTEM

FIELD OF THE INVENTION

The present invention relates generally to corner brackets. More so, the present invention provides a bracketing system for enhancing structural integrity and increasing functionality for a parallel robot assembly.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is well known that 3D printing is a process of making a three-dimensional solid object of virtually any shape from a digital model. 3D printing is achieved using an additive process, where successive layers of material are laid down in different shapes.

A parallel manipulator is a mechanical system that uses several computer-controlled serial chains to support a single platform, or end-effector. A parallel robot is a type of robot that consists of three arms connected to universal joints at the base. The key design feature is the use of parallelograms in the arms, which maintains the orientation of the end effector. The use of parallelograms restricts the movement of the end platform to pure translation, often with no rotation.

The parallel robot's base is mounted above the workspace and all the actuators are located on it. From the base, three middle jointed arms extend. The ends of these arms are connected to a small triangular platform. Actuation of the input links will move the triangular platform along an X, Y, or Z direction.

Often, the parallel robot engages the object with an end effector supported by multiple linkages that serve as arms. The linkages are independent and work in parallel. Rails may be used to carry the linkages for operation. The linkages extend from the end effector to an actuator, which serves as the foundation for the linkages.

Even though the above parallel robots address some of the needs of the market, a bracketing system for providing structural integrity and increasing the functionality of a parallel robots is still needed.

SUMMARY OF THE INVENTION

In one embodiment of the present invention, a bracketing system provides a structural support for a parallel robot and the moving components thereof. The bracketing system also serves to increase the functionality of the parallel robot. The bracketing system includes a plurality of aluminum brackets, which may often be fabricated through extrusion, and often serve as heat sinks However in other embodiments, different materials and manufacturing processes are possible, beyond extruded aluminum. The brackets comprise a substantially triangular shaped bracket disposed to integrally join with the vertices of a plurality of horizontal members and a plurality of vertical members on the parallel robot. The horizontal members and the vertical members form a triangle shape with three vertices and three sides. This allows for six brackets to position between an inner surface of each vertex. Mounting holes on the brackets enable a fastener to pass through for attaching the brackets to the vertical members and the horizontal members. The brackets slide along the vertical member to enable tightening of a tension belt and adding accessories.

In some embodiments, the parallel robot assembly may include, without limitation, a parallel robot three-dimensional printer. The bracketing system can join with the parallel robot three-dimensional printer to provide various advantages, including, without limitation: forming an extruded, unitary bracket that reduces the number of components required to operate the parallel robot three-dimensional printer; simplifying the construction of a parallel robot, by enabling actuators and motion components to be integrated into the bracketing system, thereby reducing the complexity of the bracketing system; fortifying the structural integrity of the parallel robot three-dimensional printer; serving as a heat sink for a motor; facilitating adjustments such as tensioning a drive belt; and creating a method for attaching at least one accessory to the parallel robot three-dimensional printer.

In some embodiments, the plurality of brackets comprises a substantially triangular shaped bracket disposed to integrally join with the vertices of a plurality of horizontal members and a plurality of vertical members on the parallel robot assembly. The plurality of horizontal members and the plurality of vertical members form a triangle shape with three corners or vertices and three sides. In one embodiment, three horizontal members join to form an equilateral triangle shape having 60° angles. Each bracket may be configured to integrally fit into the 60° angle. The plurality of brackets may positions between an inner surface of each vertex on both, the upper base and the lower base. A sidewall forms a peripheral for the plurality of brackets, through which mounting holes enable at least one fastener to pass through for attaching the plurality of brackets to the vertical member or horizontal member.

Each bracket comprises a vertical mounting portion for attaching to a vertical member. The vertical mounting portion includes a substantially cube shaped frame that forms a vertical member aperture for enabling at least partial passage of the vertical member for attachment. The vertical mounting portion further comprises at least one vertical mounting hole 204 for mounting the plurality of brackets on an inner surface of the vertical member through installation of at least one fastener.

Each bracket further comprises a pair of horizontal mounting portions that position on opposite ends of the vertical mounting portion for attaching to two horizontal members. Each horizontal mounting portion includes a substantially triangle shaped frame that forms a horizontal member aperture. The pair of horizontal mounting portions further comprises at least one horizontal mounting hole for mounting the plurality of brackets to two horizontal members through installation of at least one fastener. In this manner, six brackets may integrally attach to the three vertices of the upper base and the three vertices of the lower base, forming an integral unit with each.

A first aspect of the present invention provides a bracketing system for providing a structural support for a parallel robot assembly, comprising:
   a plurality of brackets, the plurality of brackets being configured to integrally join with the vertices of a plurality of horizontal members and a plurality of vertical members at an upper base and a lower base, the plurality of brackets being disposed to position and move in a parallel orientation, the plurality of brackets comprising a vertical mounting portion for attaching to each vertical member, the vertical mounting portion comprising a vertical member aperture for enabling at least partial passage of each vertical member, the vertical mounting portion further comprising at least one vertical mounting hole for mounting the plurality of brackets to the plurality of vertical members through installation of at least one fastener, the plurality of brackets further comprising a pair of horizontal mounting portions, the pair of horizontal mounting portions being disposed to position on opposite ends of the vertical mounting portion, the pair of horizontal mounting portions comprising at least one horizontal mounting hole for mounting the plurality of brackets to the plurality of horizontal members through installation of the at least one fastener, whereby the plurality of brackets enable a plurality of arms to move in translation, with at least three degrees of freedom, whereby the plurality of brackets are configured to slidably move along a longitudinal axis of the plurality of vertical members.

In a second aspect, the plurality of brackets includes a unitary, extruded bracket that joins at the vertices of the upper base and the lower base, and helps minimize the number of components to build and operate the parallel robot assembly. The vertices are formed at the junction of vertical members and horizontal members at the upper base and the lower base.

In another aspect, the plurality of brackets is operable to slidably move along the plurality of vertical members to facilitate tensioning adjustments on a drive belt, and add at least one accessory. The brackets may follow a track along the vertical members.

In yet another aspect, the plurality of brackets position in proximity to the motor to absorb thermal energy, serving as heat sinks The aluminum composition of the brackets help dissipate thermal energy.

One objective of the bracketing system is to increase the structural integrity of the plurality of brackets and the vertices between the plurality of horizontal members and the plurality of vertical members by providing a single extruded bracket that is fabricated from aluminum or a suitable rigid material. The bracket integrates into the upper base and the lower base of the parallel robot assembly. In one possible embodiment, aluminum extruded T-Slot rail and a Maker Slide rail from the parallel robot assembly fit integrally into each bracket and allow for a single corner component; thereby creating additional stiffness and strength for the entire structure. However, in other embodiments, the horizontal and vertical members that make up the bracket can include any linear motion system, or extrusion with an integrated rail or track.

Another objective is to simplify the construction of a parallel robot, by enabling actuators and motion components to be integrated into the bracketing system. This integration helps minimize the cost and labor associated with fabricating and operating the parallel robot.

Another objective is to minimize fabrication costs for the plurality of brackets by creating each bracket through extrusion, and machining the mounting holes post process.

Another objective is to minimize the number of components for supporting the parallel robot assembly by utilizing a unitary piece that does not necessitate attaching to both the inside and the outside surfaces of the vertices.

Yet another objective is to facilitate tensioning the tension belt and adding at least one accessory by enabling the plurality of brackets to move along the longitudinal axis of the plurality of vertical members.

Yet another advantage is to at least partially absorb thermal energy from the motor with an aluminum brackets that serve the dual function of heat sinks.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 1A illustrates a frontal view, and FIG. 1B illustrates a rear view, in accordance with an embodiment of the present invention;

FIG. 2A illustrates a bottom view, and FIG. 2B illustrates an upper view, in accordance with an embodiment of the present invention;

FIG. 3A illustrates a rear view having mounting holes, and FIG. 3B illustrates a side view, in accordance with an embodiment of the present invention;

Like reference numerals refer to like parts throughout the various views of the drawings.

DETAILED DESCRIPTION OF THE INVENTION

Figure 1A:
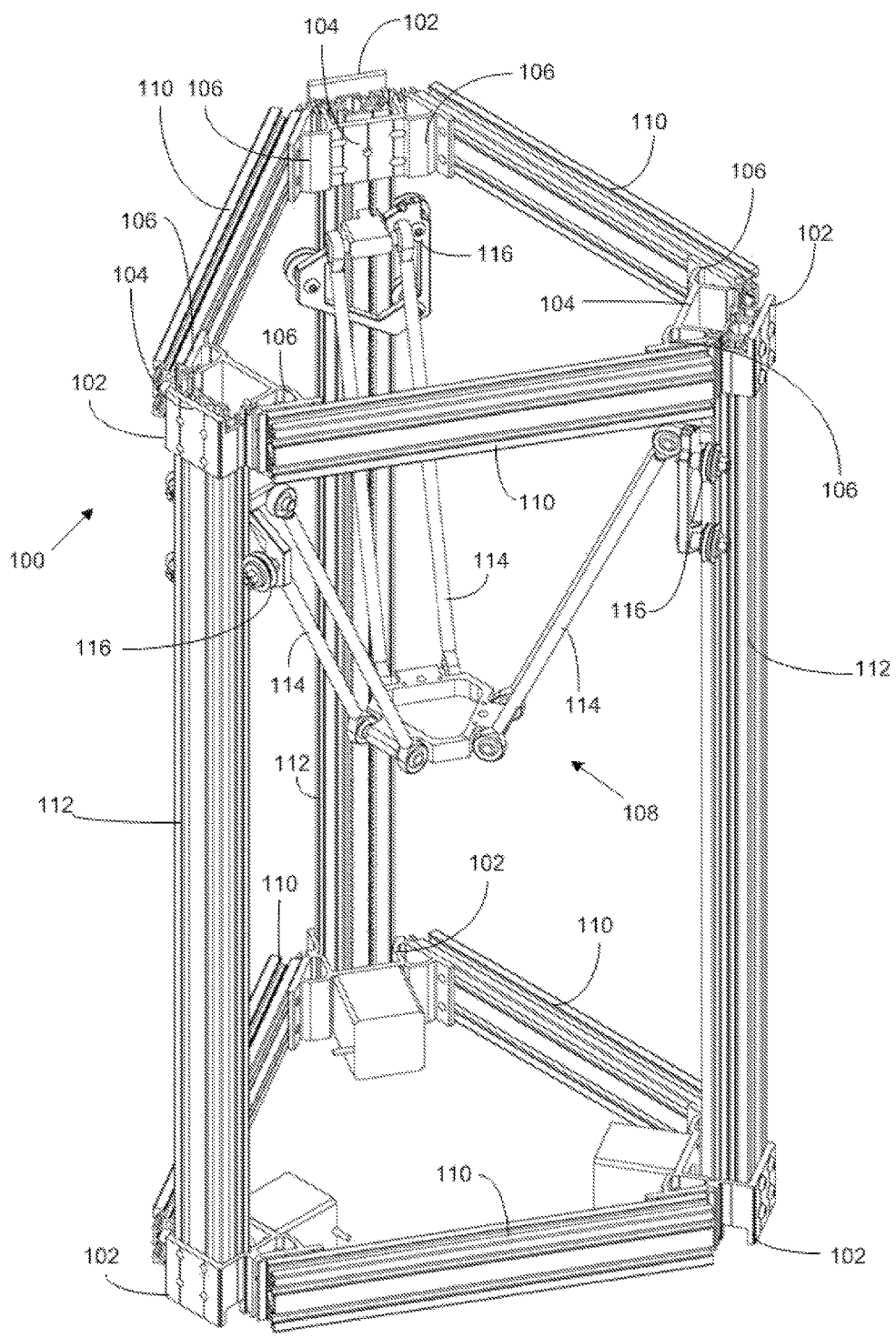
FIGS. 1A and 1B illustrate isometric views of an exemplary bracketing system joined with an exemplary parallel robot assembly, where
Figure 1B:
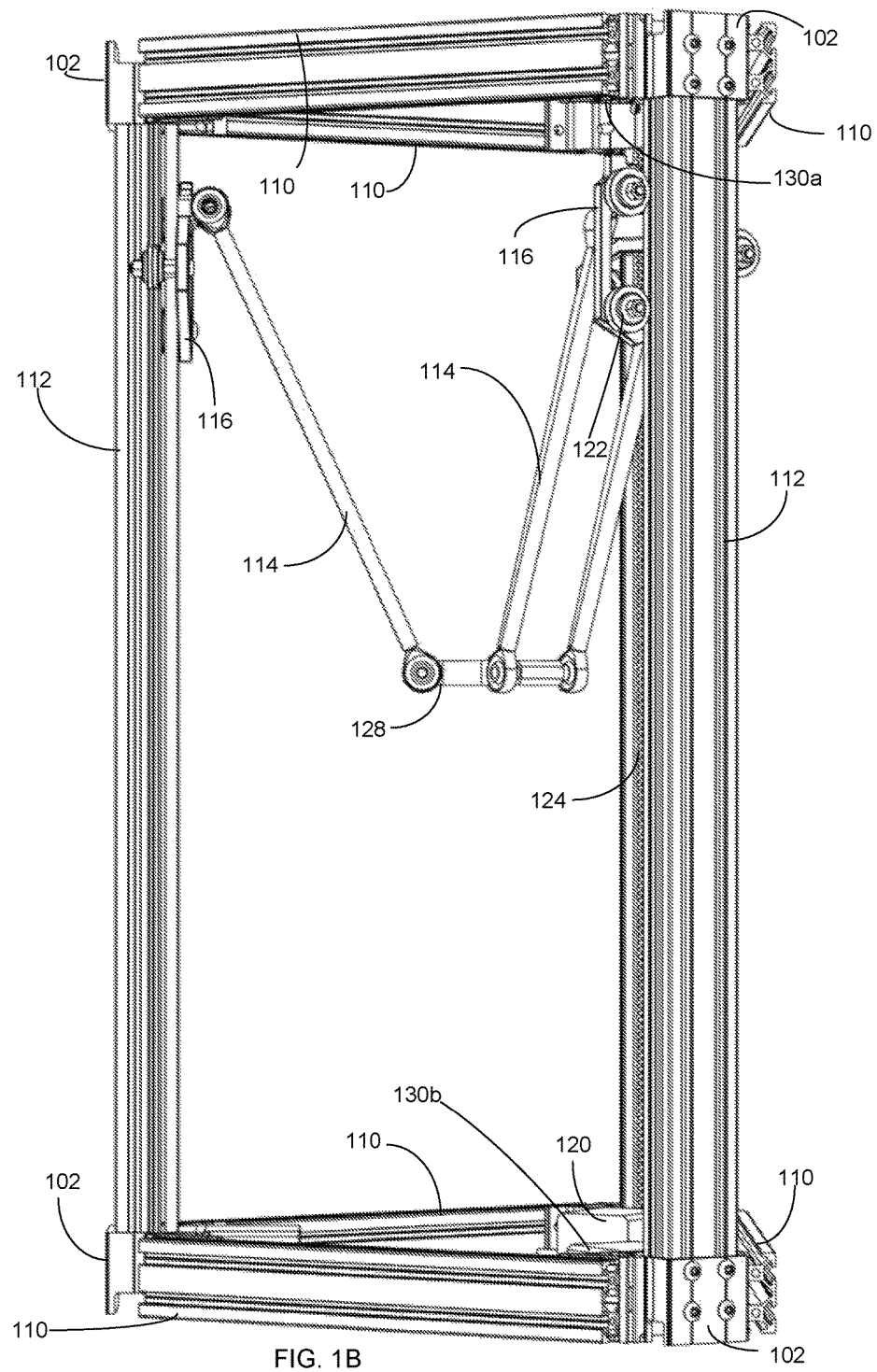

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1A and 1B. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodi- FIGS. 1A and 1B illustrate isometric views of a front side and a back side of a bracketing system 100 joined with a parallel robot assembly 108. In one embodiment of the present invention, the bracketing system 100 provides a structural support and increased functionality to the parallel robot assembly 108. The bracketing system 100 provides a structural support for a parallel robot assembly 108 and the pertinent moving components thereof. The bracketing system 100 also serves to increase the functionality of the parallel robot assembly 108 through a novel configuration and positioning. The bracketing system 100 may include a plurality of brackets 102 that join at the vertices of an upper base 132 and a lower base 134 of the parallel robot assembly 108 to provide structural integrity and increase functionality of the parallel robot assembly 108. The vertices include corners on a triangle configuration that makes up the upper base and the lower base.

In one embodiment, each bracket 102 forms a single, extruded piece that helps minimize the number of components necessary to fabricate and operate the parallel robot assembly 108. The plurality of brackets 102 include an aluminum composition and integrated attachments with an upper base and a lower base of the parallel robot assembly 108 that serves to increase the structural integrity of the bracketing system 100 and the parallel robot assembly 108. Suitable materials for the plurality of brackets 102 may include, without limitation, aluminum, steel, iron, titanium, metal alloys, fiberglass, rigid polymers, and wood.

In one embodiment, the parallel robot assembly 108 may include, without limitation, a parallel robot three-dimensional printer 118. However, in other embodiments, the parallel robot assembly 108 may include, without limitation, pick and place robots, robotic arms for manipulating light and small objects at a very high speed, robotic arms for drawing images and portraits, and robotic arms in a clean room that assemble small components. The parallel robot assembly 108 may be utilized in various industries, including, without limitation, the computer aided drafting industry, the design industry, the packaging industry, the medical industry, and the pharmaceutical industry. In some embodiments, the bracketing system 100 can join with the parallel robot assembly 108 to provide various advantages, including, without limitation: forming an extruded, unitary a unitary bracket that reduces the number of components required to operate the parallel robot three-dimensional printer; fortifying the structural integrity of the parallel robot three-dimensional printer; serving as a heat sink for a motor 120; facilitating adjustments such as tensioning a drive belt 122; and creating a method for attaching at least one accessory 130a, 130b, 130c, 130d to the parallel robot three-dimensional printer. The at least one accessory may include, without limitation, a stepper motor 130b, or a sensor 130a, or a bracket cover 130d, or threaded feet 130c. Additional advantages and functions may be allowed in other embodiments.

In one embodiment, the parallel robot assembly 108 may include a parallel robot three-dimensional printer having three parallel arms 114. Each arm 114 connects to the plurality of arm carriages 116 that traverses along a longitudinal axis of the three vertical members 112. The three vertical members 112 extend from an upper base to a lower base of the parallel robot three-dimensional printer. The vertical members comprise three aluminum bars, each bar having a vertical track 136. Both the upper base 132 and the lower base 134 are formed by three horizontal members 110 configured to form a substantially triangular shape. The plurality of arm carriages 116 carry the plurality of arms 114 in unison, between the upper base 132 and the lower base 134; thereby allowing for an up and down motion of the arms 114 during operation. The three vertical members 112 may include three parallel bars with a chain 124 and a drive belt 122. A motor 120 may power the chain to move the plurality of arm carriages 116.

The plurality of arms 114 extend from the plurality of arm carriages 116, terminating at an end effector 128 that interacts with an object on the lower base, which in this embodiment may include additive manufacturing of the object. Similar to the upper base, the lower base is formed by three horizontal members 110 configured to form a substantially triangular shape. The lower base may further include a triangular shaped engagement surface 126 for the arms to engage, or create the object. Those skilled in the art will recognize that the plurality of arms 114 forms parallelograms in relation to each other, and that the parallelogram configuration restricts the movement of the end effector for translation of movements in three degrees, such as an X, Y, and Z direction with no rotation. In one embodiment, the plurality of arms 114 may include two rigid linear bodies connected together by one or several loops forming a plane polygon. However, in other embodiments, various configurations for the positioning and movement of the plurality of arms 114 may be utilized. In this embodiment, the bracketing system 100 utilizes six brackets 102 that position at the vertices of the upper base and the lower base. In this position, the brackets form terminal points for the plurality of arm carriages 116 while sliding along the vertical members 112.

Figures 2A, 2B:
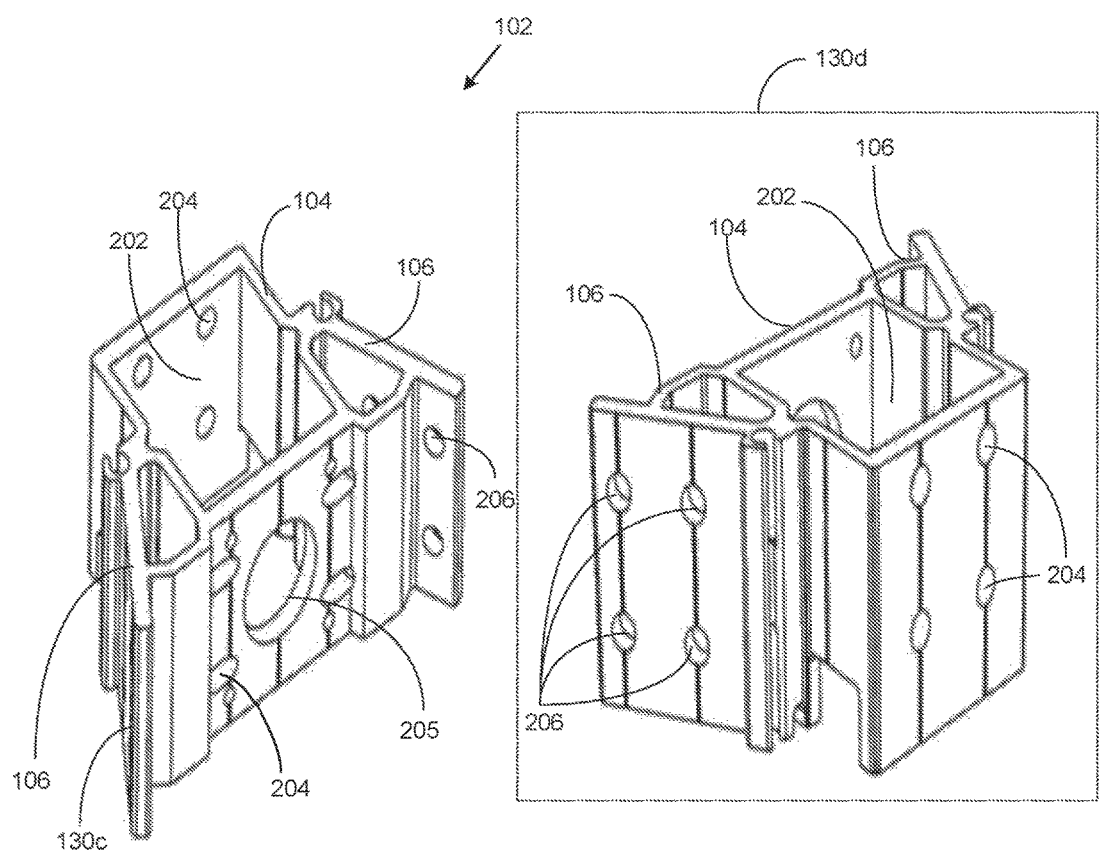
FIGS. 2A and 2B illustrate isometric views of an exemplary bracket, where
Figure 3A:
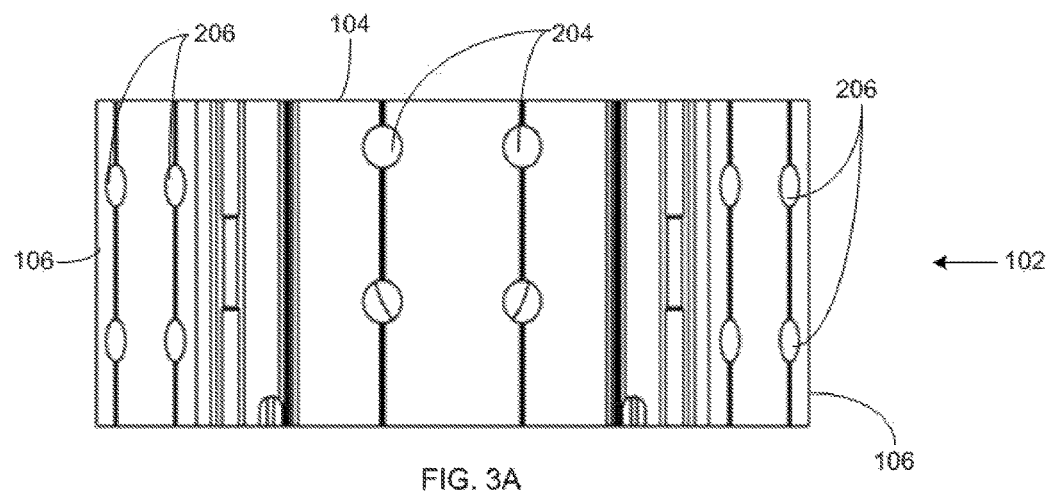
FIGS. 3A and 3B illustrate various views of an exemplary bracket, where
Figure 3B:
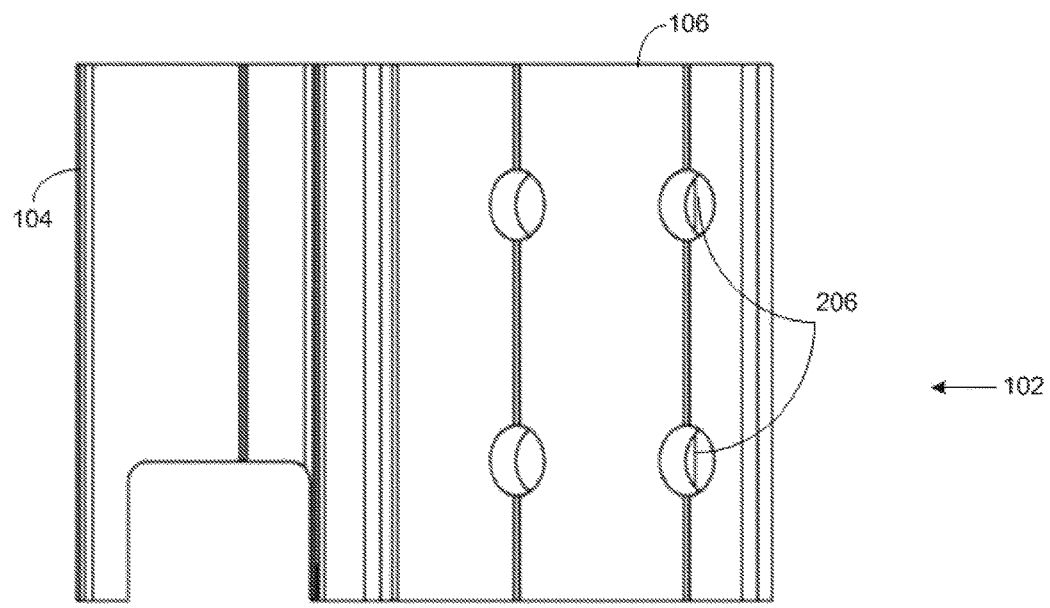

Turning now to FIGS. 2A and 2B, the plurality of brackets 102 comprises a substantially triangular shaped bracket disposed to integrally join with the vertices of a plurality of horizontal members 110 and a plurality of vertical members 112 on both the upper base and the lower base of the parallel robot assembly 108. However, in other embodiments, the plurality of brackets 102 may take any shape and dimension that integrates into the upper base and the lower base. The plurality of horizontal members 110 and the plurality of vertical members 112 form a triangle shape with three corners or vertices and three sides. In one embodiment, three horizontal members 110 join to form an equilateral triangle shape having 60° angles. Each bracket may be configured to integrally fit into the 60° angle. However, in other embodiments, the triangle may be configured as an isosceles triangle and a scalene triangle, depending on the capacity and function of the parallel robot assembly 108. In either alternative triangle, though, the parallel functionality for the plurality of brackets 102 and the plurality of arms 114 remain intact. In some embodiments, the plurality of brackets 102 may positions between an inner surface of each vertex on both, the upper base and the lower base. A sidewall forms a peripheral for the plurality of brackets 102, through which at least one vertical mounting hole 204 and at least one horizontal mounting hole 206 enable at least one fastener to pass through for attaching the plurality of brackets 102 to the vertical member or horizontal member, respectively (FIGS. 3A and 3B).

Figure 4:
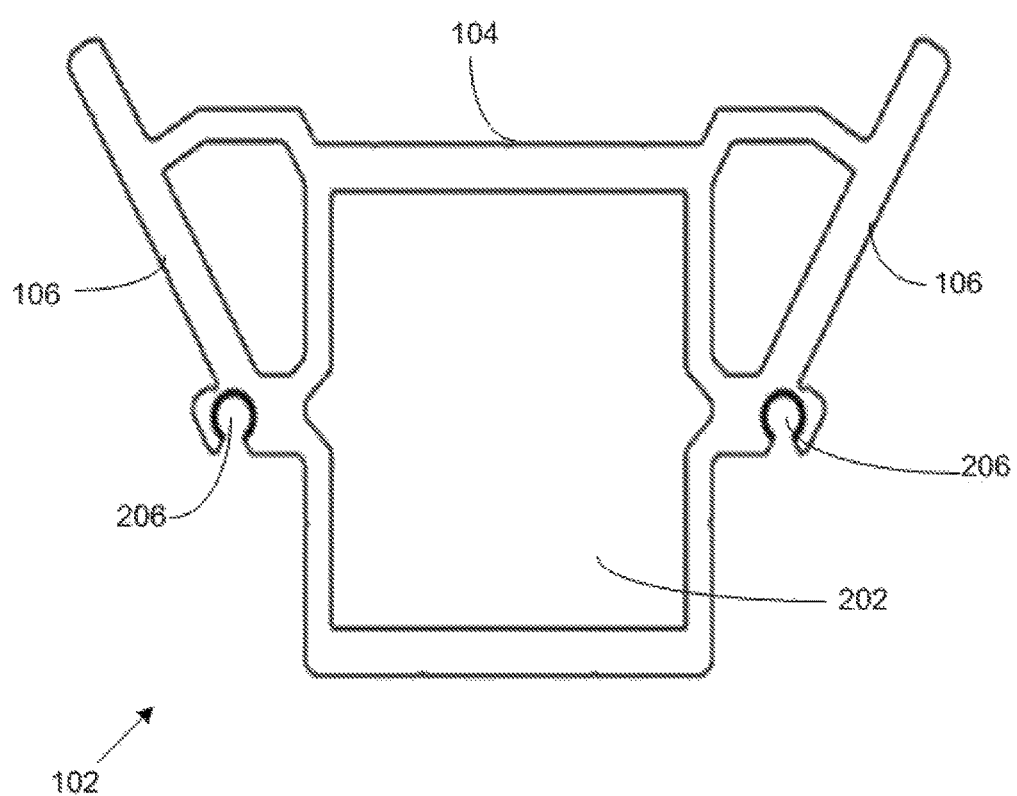
FIG. 4 illustrates a top view of an exemplary bracket, in accordance with an embodiment of the present invention.

Each bracket 102 comprises a vertical mounting portion 104 for attaching to each vertical member 112. In addition, each bracket 102 includes a motor aperture 205 having a first diameter. As referenced in FIG. 4, the vertical mounting portion 104 includes a substantially cube shaped frame that forms a vertical member aperture 202 for enabling at least partial passage of the vertical member 112 for attachment.

The vertical mounting portion 104 further comprises at least one vertical mounting hole 204 having a second diameter smaller than the first diameter of the motor aperture 205, and for mounting the plurality of brackets 102 on an inner surface of the vertical member 112 through installation of at least one fastener.

Each bracket 102 further comprises a pair of horizontal mounting portions 106 that position on opposite ends of the vertical mounting portion 104 for attaching to two horizontal members 110. Each horizontal mounting portion 106 includes a substantially triangle shaped frame. The pair of horizontal mounting portions 106 further comprises at least one horizontal mounting hole 206 for mounting the plurality of brackets 102 to two horizontal members 110 through installation of at least one fastener. In this manner, six brackets 102 may integrally attach to the three vertices of the upper base and the three vertices of the lower base, forming an integral unit with each.

In one embodiment, the plurality of brackets 102 form a heat sink (not shown) for absorbing thermal energy generated by the motors (not shown) operating in the plurality of vertical members 112. In some embodiments, the plurality of brackets 102 include heat sinks that position on the inside of the plurality of brackets 102. Those skilled in the art will recognize that a heat sink is a passive heat exchanger component that cools a device by absorbing thermal energy and dissipating heat into the surrounding air. An aluminum heat sink may be useful for absorbing heat generated by the motors of a parallel robot assembly 108. The motors actuate the plurality of arms 114 to move in quick, repetitive motions, and myriad change of directions. This copious quantity of movement may generate excessive thermal energy on the parallel robot assembly 108. The heat sinks on the plurality of brackets 102 may be efficacious for dissipating the heat generated by the motors. Suitable materials for the heat sink may include, without limitation, aluminum, copper, and ceramics.

Figure 5:
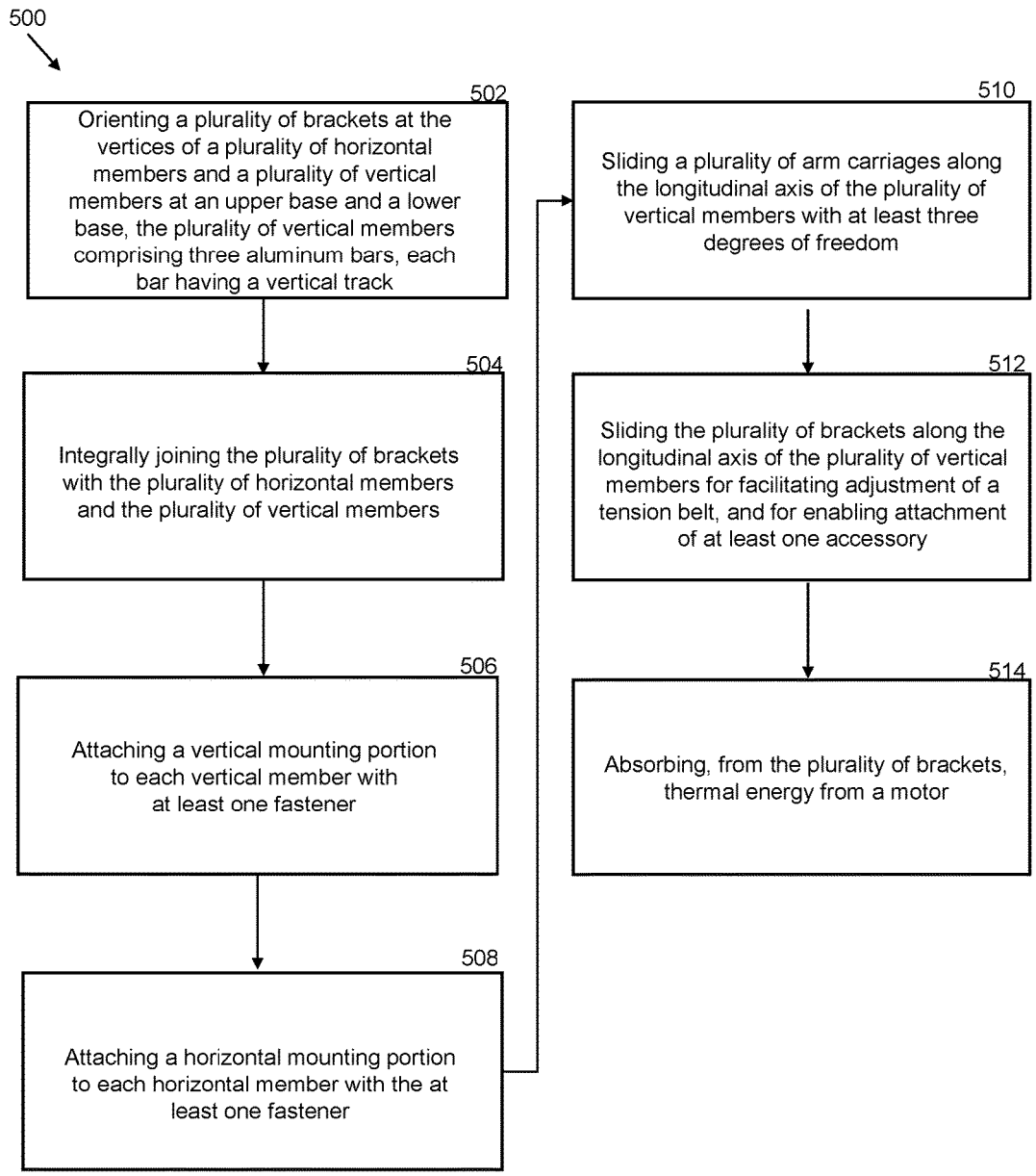
FIG. 5 presents a flowchart diagram of a method for providing a structural support and increased functionality to a parallel robot assembly with a bracketing system, in accordance with an embodiment of the present invention.

In one embodiment of the present invention, the bracketing system 100 may utilize a method 500 for providing a structural support and increased functionality to a parallel robot assembly 108. In operation, the method is described in FIG. 5, and may include an initial Step 502 of orienting a plurality of brackets at the vertices of a plurality of horizontal members and a plurality of vertical members at an upper base and a lower base, the plurality of vertical members comprising three aluminum bars, each bar having a vertical track. The plurality of brackets 102 comprises a substantially triangular shaped bracket disposed to integrally join with the vertices of a plurality of horizontal members 110 and a plurality of vertical members 112 on the parallel robot assembly 108.

In some embodiments, a Step 504 includes integrally joining the plurality of brackets 102 with the plurality of horizontal members 110 and the plurality of vertical members 112. Each bracket 102 may be configured to integrally fit into a 60° angle formed at the vertices between the plurality of horizontal members 110 and the plurality of vertical members 112. In some embodiments, the plurality of brackets 102 may positions between an inner surface of each vertex on both, the upper base and the lower base. A next Step 506 comprises attaching a vertical mounting portion to each vertical member with at least one fastener. The vertical member aperture 202 is sized and dimensioned to enable each vertical member 112 to at least partially pass through for additional fastening.

In one embodiment of the present invention, the method 500 may further comprise a Step 508 of attaching a horizontal mounting portion to each horizontal member with the at least one fastener. The at least one fastener may pass through at least one vertical mounting hole 204. The at least one fastener may include, without limitation, a bolt, a screw, a pin, a hook, a magnet, and an adhesive. A next Step 510 comprises sliding a plurality of arm carriages along the longitudinal axis of the plurality of vertical members with at least three degrees of freedom. The at least one fastener, here, passes through at least one horizontal mounting hole 206 that is sized and dimensioned to align with the plurality of horizontal members 110 for fastening.

A next Step 512 may include sliding the plurality of brackets along the longitudinal axis of the plurality of vertical members for facilitating adjustment of a tension belt, and for enabling attachment of at least one accessory. Arms 114 extend from the brackets 102. The plurality of arms 114 extend from the plurality of arm carriages 116, terminating at an end effector that interacts with an object on the lower base, which in one embodiment may include additive manufacturing of the object. The plurality of arms 114 form parallelograms in relation to each other, and that the parallelogram configuration restricts the movement of the end effector for translation of movements in three degrees, such as an X, Y, and Z direction with no rotation. The brackets 102 serve another important purpose, discussed below.

A final Step 514 involves absorbing, from the plurality of brackets, thermal energy from a motor. The plurality of brackets 102 include heat sinks that position on the inside surface of the plurality of brackets 102. The heat sink serves as a passive heat exchanger component that cools the motor by absorbing thermal energy and dissipating heat into the surrounding air. For example, lowering the plurality of brackets 102 towards the lower base may alleviate pressure on the tension belt. The tension belt may then be adjusted and retightened to a desired tension. The at least one accessory comprises a stepper motor, and/or a sensor, and/or a bracket cover, and/or threaded feet. The at least one accessory may integrate into the plurality of brackets 102; thereby reducing the complexity of the bracketing system 100.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What we claim is:

1. A bracketing system for a parallel robot assembly, the bracketing system comprising:
    a plurality of brackets configured to integrally join vertices of a plurality of horizontal members and a plurality of vertical members at an upper base and a lower base, the plurality of brackets being disposed to position and move in a parallel orientation;
    each bracket of the plurality of brackets comprising a vertical mounting portion for attaching to a respective vertical member of the plurality of vertical members, the vertical mounting portion comprising a vertical member aperture for enabling at least partial passage of the respective vertical member, the vertical mounting portion further comprising at least one vertical mounting hole; and
    each bracket of the plurality of brackets further comprising a pair of horizontal mounting portions on opposite ends of the vertical mounting portion, the pair of horizontal mounting portions comprising at least one horizontal mounting hole, whereby each bracket is configured to slidably move along a longitudinal axis of the respective vertical member.

2. The system of claim 1, wherein each bracket comprises a unitary extrusion of aluminum composition.

3. The system of claim 1, wherein the upper base comprises three horizontal members oriented into a substantially triangular shape.

4. The system of claim 1, wherein the lower base comprises three horizontal members oriented into a substantially triangular shape.

5. The system of claim 1, wherein the plurality of horizontal members comprises three aluminum bars.

6. The system of claim 1, wherein each vertical member comprises a track to guide an arm carriage along the longitudinal axis of the respective vertical member.

7. The system of claim 6, wherein each bracket is configured to move along the longitudinal axis of the respective vertical member for facilitating adjustment of a drive belt and/or attaching at least one accessory to the parallel robot assembly.

8. The system of claim 1, wherein the plurality of brackets are configured to absorb thermal energy.

9. A bracket for a bracketing system for a parallel robot assembly, the bracket comprising:
- a frame defining an opening therein, the frame having a first side, a second side, a front side, and a rear side;
- a first leg extending away from the first side to beyond the rear side of the frame;
- a second leg extending away from the second side to beyond the rear side of the frame, an angle between the first leg and the second leg forming a substantially sixty degree angle;
- a motor aperture having a first diameter formed in the rear side of the frame; and
- a plurality of mounting apertures having a second diameter smaller than the first diameter, and formed in the frame and the first and second legs an upper base comprising three horizontal members;
a lower base comprising three horizontal member;
the upper base is configured to be supported above and spaced apart from the lower base by vertical members.

10. The bracket of claim 9, wherein the motor aperture is centrally disposed in the rear side of the frame.

11. The bracket of claim 10, wherein the opening comprises a polygon.

12. A bracketing system for a parallel robot assembly, the bracketing system comprising:
a plurality of brackets, each bracket comprising
- a frame defining an opening therein, the frame having a first side, a second side, a front side, and a rear side,
- a first leg extending away from the first side to beyond the rear side of the frame,
- a second leg extending away from the second side to beyond the rear side of the frame, an angle between the first leg and the second leg forming a substantially sixty degree angle,
- a motor aperture having a first diameter formed in the rear side of the frame, and
- a plurality of mounting apertures having a second diameter smaller than the first diameter, and formed in the frame and the first and second legs;

an upper base comprising three horizontal members coupled together with three upper brackets alongside respective first and second legs of the three upper brackets;

a lower base comprising three horizontal members coupled together with three lower brackets alongside respective first and second legs of the three lower brackets; and the upper base supported above and spaced apart from the lower base by three vertical members each coupled to a respective bracket using a respective opening defined therein.

* * * * *